United States Patent [19]

Gagnon et al.

[11] 3,966,571

[45] June 29, 1976

[54] METHOD OF OPERATING A DYNAMICALLY PACKED BED ELECTRODE ELECTROCHEMICAL CELL SYSTEM

[75] Inventors: Eugene G. Gagnon, Utica; Kao-Wen Mao, Sterling Heights, both of Mich.

[73] Assignee: General Motors Corporation, Detroit, Mich.

[22] Filed: Sept. 3, 1975

[21] Appl. No.: 610,067

Related U.S. Application Data

[62] Division of Ser. No. 463,533, April 24, 1974, abandoned.

[52] U.S. Cl. ............................... 204/149; 204/130; 204/152; 204/1 R
[51] Int. Cl.² ..................... C25B 1/46; C25B 15/00
[58] Field of Search .......... 204/1 R, DIG. 1, DIG. 3, 204/130, 131, 149, 152, DIG. 4; 136/86 R

[56] References Cited
UNITED STATES PATENTS

| | | |
|---|---|---|
| 3,457,152 | 7/1969 | Maloney, Jr. et al. ............... 204/131 |
| 3,716,459 | 2/1973 | Salter et al. ......................... 204/1 R |
| 3,755,114 | 8/1973 | Tarjanyi et al. .................. 204/149 X |

Primary Examiner—T. Tung
Assistant Examiner—A. C. Prescott
Attorney, Agent, or Firm—Robert J. Wallace

[57] ABSTRACT

A system and method for high rate electrochemical reactions involving an electrode of loose conductive particles packed together by rapid electrolyte flow. In the method the conductive particles are intermittently automatically unpacked and repacked into new particle relationships, by interrupting and resuming the rapid electrolyte flow.

2 Claims, 8 Drawing Figures

METHOD OF OPERATING A DYNAMICALLY PACKED BED ELECTRODE ELECTROCHEMICAL CELL SYSTEM

RELATED PATENT APPLICATION

This application is a division of U.S. Pat. application Ser. No. 463,533 entitled "Dynamically Packed Bed Electrode Electrochemical Cell System and Method of Operating This System," filed Apr. 24, 1974, now abandoned, in the names of Eugene G. Gagnon and Kao-Wen Mao, and assigned to the assignee of this application.

BACKGROUND OF THE INVENTION

This invention relates to a method and apparatus involving an electrochemical cell. The electrochemical cell has a bed type electrode of conductive particles that are dynamically packed together by a rapidly flowing electrolyte.

Discrete conductive particles have been used for porous electrochemical cell electrodes in several forms. In one type the conductive particles are bonded together, with or without compression, to form a porous body or briquette. In another type, the conductive particles are packed in a fixed relationship between two retaining screens, forming a fixed bed electrode. It is also known to suspend the conductive particles in a flowing electrolyte to form a moving slurry or a fluidized bed of conductive particles.

All of these approaches to making electrodes of conductive particles while possessing certain advantages, also have certain disadvantages. For example, bodies of bonded particles form low electrical resistance electrodes. However, such electrodes generally present a high resistance to flow of electrolyte through them, resulting in low mass transfer rates. Fixed bed electrodes have higher mass transfer rates. On the other hand, they are subject to channeling. Fluidized bed and slurry electrodes have high mass transfer rates but have poor electrical conductivity.

We have now found a superior type of particle electrode, as well as a method and system for using it. Our method and system provide slow electrical resistance and high mass transfer rates, without problems of channeling.

OBJECTS AND SUMMARY OF THE INVENTION

It is therefore an object of this invention to provide an improved electrochemical system having a new type of conductive particle electrode. It is also an object of this invention to provide a new electrochemical method that involves a unique way of using our new type of conductive particle electrode.

These and other objects of the invention are obtained with conductive electrode particles loosely disposed in a closed chamber between two particle restraining means, such as screens, that are porous to an electrolyte. The electrolyte is rapidly flowed through the chamber to pack the conductive particles against one of the screens, to form a bed. Periodically the rapid electrolyte flow is interrupted, to allow automatic unpacking of the conductive particles. The rapid electrolyte flow is then resumed, to repack the conductive particles into new particle relationships. A counterelectrode is provided. In a preferred embodiment the particles and the counterelectrode are separated by a semipermeable partition portion.

BRIEF DESCRIPTION OF THE DRAWING

Other objects, features and advantages of this invention will become apparent from the following description of preferred examples thereof and from the drawing, in which.

DESCRIPTION OF THE PREFERRED EMBODIMENTS

Our dynamically packed electrode and the method of using it can be used in any electrochemical cell of either the electrolytic or voltaic type. By electrolytic cell we mean a cell having electrode reactions induced by applying an electrical potential from an external source across the cell electrodes. An electroplating cell is one example. By a voltaic cell we mean an electrochemical cell which itself produces an electrical potential across its electrodes by electrochemical reactions at its electrodes. A lead storage battery, and a hydrogen-oxygen fuel cell are two examples of this latter type of cell.

We also want to note that our dynamically packed electrode and method of operating it can be used in a variety of cell constructions and electrochemical reactions. The electrochemical reactions can involve oxidation or reduction of a reactant. The reactant can be the electrolyte, a substance in the electrolyte, or even the electrode particles themselves. It can be especially useful in substantially continuous electrochemical processes, such as electrochemical water purification treatments.

Figure 1:
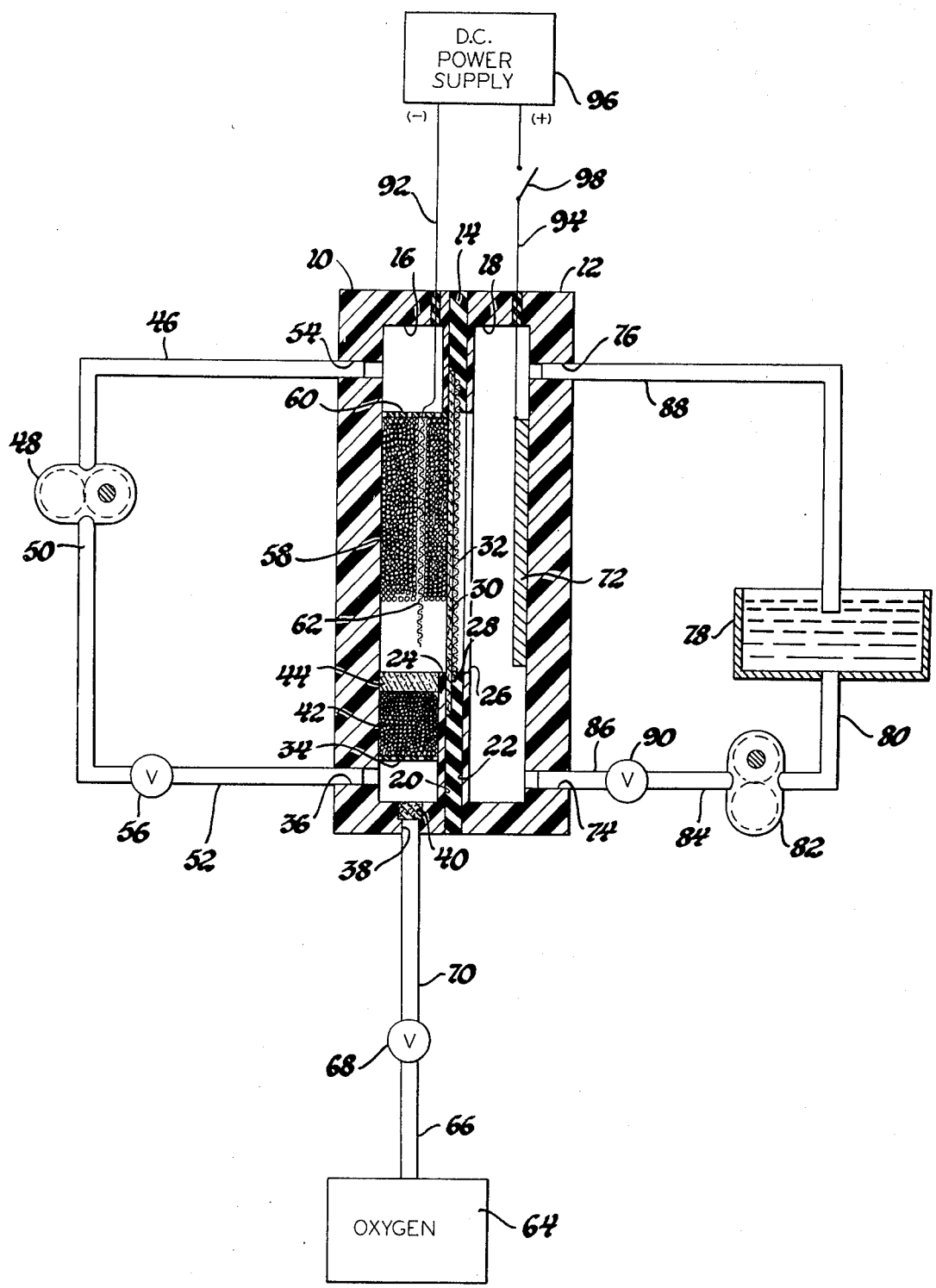
FIG. 1 illustrates a system including an electrochemical cell having a conductive particle electrode made in accordance with this invention.
Figure 2A:
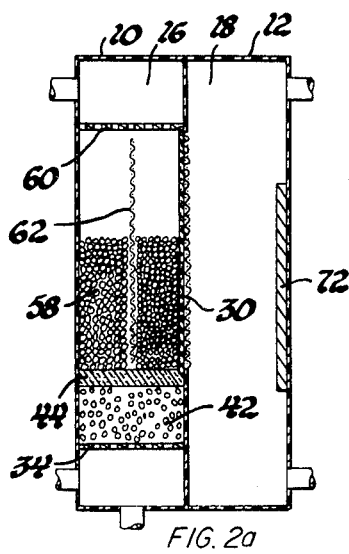
FIGS. 2a through 2g diagrammatically show the cell in FIG. 1 as it is cycled to pack and unpack the dynamically packed electrode.
Figure 2B:
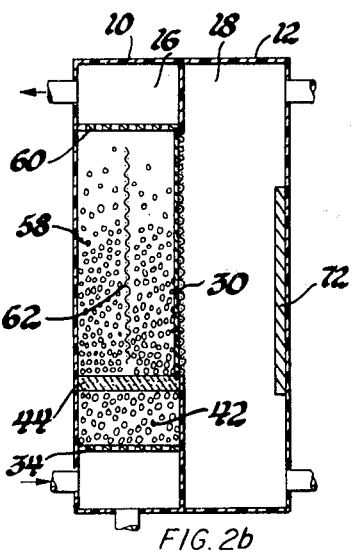
Figure 2C:
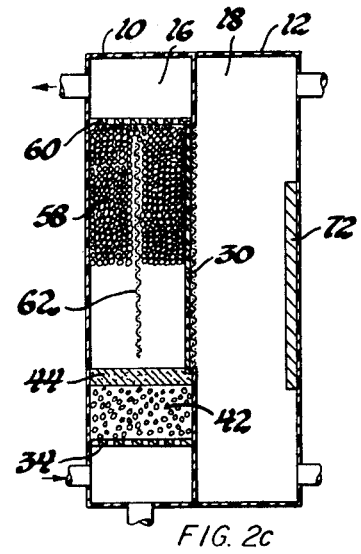
Figure 2D:
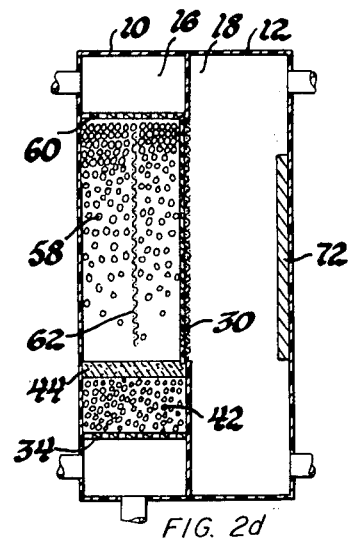
Figure 2E:
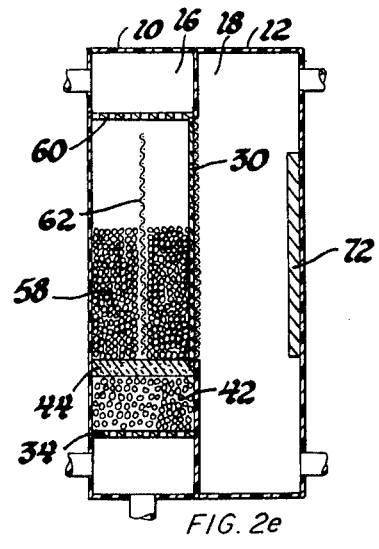
Figure 2F:
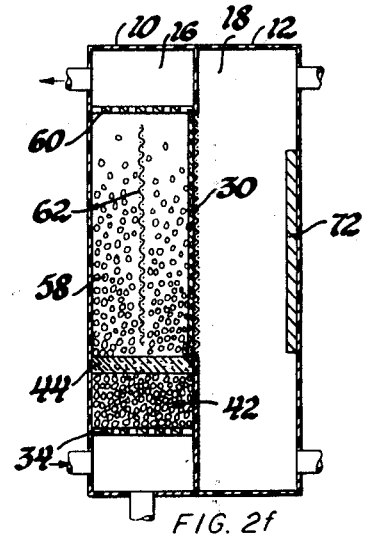
Figure 2G:
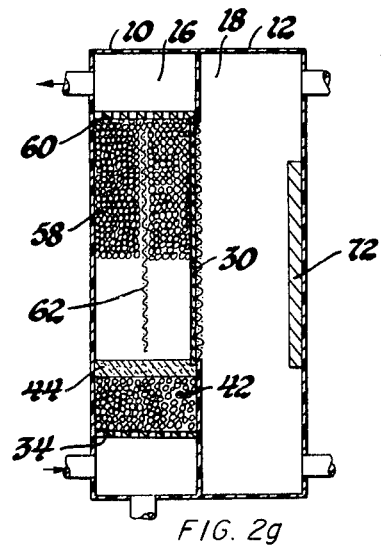

Serving as one specific example of this invention is the following description of an electrolytic cell and attendant system for electrolyzing oxygen gas, using insoluble electrodes and a potassium hydroxide electrolyte. FIG. 1 shows a prismatic electrochemical cell body made of two hollow rectangular transparent plastic members 10 and 12 clamped together, with tie bolts (not shown) against an interjacent flat rectangular silicone rubber seal 14. Hollow body member 10 has a vertically oriented prismatic chamber 16 therein, while hollow body member 12 has a vertically oriented prismatic chamber 18 therein. Chambers 16 and 18 are rectangular parallelepipeds about 1.3 cm. wide, 1 cm. thick, and 5 cm. high. The flat facing surfaces 20 and 22 of members 10 and 12 each have a large rectangular opening 24 and 26, exposing their respective chambers 16 and 18. Openings 24 and 26 are congruent with a large rectangular opening 28 in the rubber seal member 14. A rectangular sheet-like semipermeable diaphragm 30, supported by a reinforcing screen 32, is sandwiched between seal 14 and the facing surface 20 of body member 10. Diaphragm 30 is made of an ion exchange resin, parchment paper, cellophane, or the like. A microporous separator from a lead storage battery also could be used. It is larger in planer dimensions than opening 24, and extends completely across it. Thus the diaphragm 30 physically separates chambers 16 and 18, but permits ionic communication between them.

An immovable flat screen 34 extends completely across the length and width of the bottom of chamber 16, above an electrolyte inlet 36 and an oxygen gas inlet 38. Oxygen gas inlet 38 has a filter member 40. A fixed bed of glass beads 42 rests on screen 34. Glass beads 42 are about 1 mm. in diameter. Upward movement of the glass beads 42 is prevented by a stationary and tightly covering fritted glass plate 44. The fritted glass plate is about ¼ inch thick and has a pore size of about 145 – 175 μ.

An aqueous solution containing 33 weight percent potassium hydroxide serves as an electrolyte for chamber 16. It is continuously recirculated through chamber 16 by means of conduit 46, high velocity pump 48 and conduits 50 and 52, which extend between an outlet 54 in the upper part of chamber 16 and inlet 36 in the lower part. A valve 56 between conduits 50 and 52 controls adjustment or interruption of the flow of electrolyte through chamber 16.

A quantity of conductive particles 58 are loosely disposed in chamber 16 over the fritted glass plate 44 and below a nickel retaining screen 60 of 60 mesh. Screen 60 is rectangular and extends across the entire cross section of chamber 16 immediately below electrolyte outlet 54. Conductive particles 58 are irregularly shaped silver granules with a thin catalytic coating of 92%, by weight, silver and 8%, by weight, palladium. They are about 20 – 40 mesh in diameter and freely movable between fritted glass plate 44 and screen 60. Screen 60 and fritted glass plate 44 are parallel and spaced about 4½ cm. apart. At rest, the conductive particles 58 fill the chamber to about 65% of distance or height between screen 60 and fritted glass plate 44. The conductive particles 58 form a bed spaced above the fritted glass plate 44.

The bed of conductive particles 58 is dynamically packed against screen 60 and maintained in contact with a screen type current collector 62 by a rapid flow of electrolyte through chamber 16. Current collector 62 is centered in chamber 16 with conductive particles 58 packed around it. There is no spacing between them as might be inferred from FIG. 1. The packing is depicted in FIG. 1 so that the current collector screen 62 can be readily seen. An oxygen gas source 64 communicates with inlet 38 at the lower end of chamber 16 by means of conduit 66, valve 68 and conduit 70. The oxygen gas and electrolyte solution are introduced below the glass beads 42 and covering fritted glass plate 44, to provide good intermixing of the oxygen gas with the electrolyte, and good dispersion across the entire cross section of the chamber before it contacts the conductive particles 58.

Chamber 18 in the other cell body member 12 has a 2 inch by 2 inch rectangular nickel counterelectrode 72 affixed to its outer wall opposite opening 26. Chamber 18 has an electrolyte inlet 74 in its lower portion and electrolyte outlet 76 in its upper portion. An aqueous solution containing 33 weight percent potassium hydroxide in an open container 78 is the electrolyte for chamber 18. Conduit 80, pump 82, conduit 84 and conduit 86 convey the electrolyte from container 78 to chamber inlet 74. It exits the chamber 18 and returns to container 78 through conduit 88. Flow of electrolyte through chamber 18 can be controlled by valve 90 between conduits 86 and 84.

Chambers 16 and 18 are physically isolated from one another by means of the porous diaphragm 30, as previously noted. Accordingly, electrolyte solutions of different concentrations or different compositions can be used in the separate chambers.

An insulated wire 92 connected to current collector 62 extends out of the cell body to facilitate external electrical connection to conductive particles 58. Analogously, insulated wire 94 contacts counterelectrode 72 and extends out of cell body 12 for connection of external circuitry. A direct current power supply 96 is connected across wires 92 and 94, for applying a negative and positive potential, respectively, to conductive particles 58 and counterelectrode 72. A switch 98 in series in the positive potential supply line 94, can be used to interrupt cell reactions and resume them as desired.

The potassium hydroxide electrolyte is recirculated through chamber 16 at the rate of approximately 0.4 liter per minute. This is more than enough to insure good packing and yet not so high as to make pumping requirements prohibitive. Concurrently, approximately 0.2 liter per minute oxygen gas is introduced into chamber 16 through inlet 38. At such a flow rate, a cathodic potential of about −0.15 volts (vs. Hg/HgO reference electrode) is applied at a current of about 400 mA. Oxygen is reduced at the surface of the conductive particles 58 and oxygen is produced at the counterelectrode 72. Gas liberation at counterelectrode 72 is the reason for having an open electrolyte reservoir 78 for chamber 18. In this system, our dynamically packed electrode of conductive particles 58 is extremely resistant to channeling at all flow rates tried. However, in time the catalytic activity of the conductive particles may decrease, and repacking may increase it. If so, valves 56 and 90 are closed and switch 88 opened. Conductive particles 58 are allowed to unpack and fall down against fritted glass plate 44. It is preferred to allow all of the particles to fall away from the upper screen 60. Then, valves 56 and 90 are opened, to resume electrolyte flow through chambers 16 and 18. After the conductive particles 58 are completely repacked in new particle relationships, switch 88 is closed and the electrochemical reactions are started again.

It can, therefore, be seen that this invention not only involves dynamically packing conductive particles but also periodically automatically unpacking these particles and repacking them in new particle relationships. In the foregoing example, automatic unpacking is achieved by merely stopping electrolyte flow and allowing gravity to unpack the conductive particles. In this manner, any channels that develop in the bed during use are removed, changes in porosity due to impurities filling pores in the bed are reduced, and high conductivity among the particles is maintained during the electrochemical reaction. Thus, the lifetime of the bed is significantly extended before it must be removed from the cell.

FIG. 2 diagrammatically shows the sequence of packing and unpacking the electrode in a series of stop-action illustrations. FIG. 2a shows the particles at rest on the glass frit plate 44 before rapid flow of electrolyte is started. As rapid electrolyte flow commences the particles are initially entrained and suspended, such as in a fluidized bed electrode. FIG. 2b shows the particles fluidized. As the velocity of the electrolyte increases to its normal rapid level, the fluidized particles are packed against the upper screen 60, as shown in FIG. 2c. As hereinbefore mentioned, our electrode is resistant to channeling. However, a channel can eventually develop in the bed shown in FIG. 2c, or the porosity may change due to plugging of some of the pores in the bed. One would normally want to repack the electrode at this point or before. Rapid electrolyte flow is interrupted, allowing the particles to fall away from the upper screen 60 as shown in connection with FIGS. 2d and 2e. In the specific example of this invention, stopping electrolyte flow is enough to obtain automatic unpacking by gravity forces. If gravity alone is not enough to initiate unpacking, vibration or a reverse electrolyte flow can be used to initially dislodge the packed particles 58. We prefer to maintain the interruption until the particles have become fully unpacked. FIG. 2d shows this. The rapid electrolyte flow is then restarted in the forward direction, whereupon the particles are initially entrained as shown in FIG. 2f, and then dynamically repacked against screen 60 as shown in connection with FIG. 2g. Unpacking and repacking can be done as needed or on a fixed periodic basis, as one prefers.

It was mentioned that in some instances gravity alone may not be enough to initiate unpacking of the conductive particles 58 from the dynamically packed bed. Vibration or reversing the electrolyte flow may be necessary to start it. This would be especially necessary where finer conductive particles are used, sludge builds up, longer cycle times are involved, etc. In other instances, such as with larger particles and heavier and purer electrolytes, unpacking is easily obtained without vibration or reverse electrolyte flow. In fact, electrolyte flow may not even have to be entirely stopped, only slowed down. Accordingly, by interrupting rapid electrolyte flow we mean to also include slowing down the velocity of the electrolyte passing through chamber 16 enough to permit automatic unpacking.

The composition of the conductive particles 58 will vary depending on the electrochemical reaction which is desired. In an electrolytic cell it would be preferred that they not be oxidized or reduced but merely provided a site for such a reaction. In such instance they function as an insoluble electrode. Insoluble electrodes can be of a solid metal, such as platinum, palladium, titanium, nickel, etc., or of a vitreous material having such a metallic coating. Analogously, the size of the particles involved can vary depending on the desired porosity and surface area. Other factors are the size of the bed, the tightness of dynamic packing desired, and the electrolyte pumping capacity available.

The quantity of conductive particles 58 that is preferred will, of course, vary with the size of the cell chambers used. On the other hand, we prefer that the conductive particles occupy no more than about 90% of the height between the screen 60 and the fritted glass plate 44. By height we mean the linear dimension or distance between the facing surfaces of screen 60 and fritted glass plate 44. On the other hand, a quantity occupying less than about 50% of that height is unnecessary and wasteful of space. A quantity occupying about 60% – 80% of this height should generally provide satisfactory results.

A rapid electrolyte flow will produce the dynamic packing of this invention. However, the particular velocity of electrolyte flow actually needed to achieve the dynamic packing of this invention will vary with the size and density of the conductive particles, the density of the electrolyte, etc. However, any velocity which is sufficient to pack substantially all the conductive particles in chamber 16 into a fixed bed against the upper screen 60 is considered to be a rapid electrolyte flow within the scope of this invention.

Current collector 62 is a screen of a metal resistant to attack by the electrolyte and electrode reactant. In this example of the invention it can be silver. However, the current collector 62 can be in any shape which will carry current from the bed of conductive particles with low electrical resistance. It can be a rod, a plate, or the like. It may be desirable to make it of, or coat it with, the metal of the conductive particles 58. Moreover, screen 60 can also be used in current collection.

The particular means by which the conductive particles are restrained within the chamber is not of special significance so long as the means is porous to the electrolyte and resistant to chemical attack.

Counterelectrode 72 is shown in the drawing as being in a separate chamber 18 through which a separate electrolyte is circulated. On the other hand, the same electrolyte solution could be circulated through both chambers 16 and 18.

A separate chamber for counterelectrode 72 is not necessarily required. A counterelectrode could be provided in chamber 16, above retaining screen 60. Moreover, cell body member 12 could be omitted and cell body member 10 and its attendant portions could be immersed directly in electrolyte container 78 along with counterelectrode 72. Alternatively, cell body 10 may be horizontally disposed on the surface of the electrolyte in container 78, with only the semipermeable diaphragm 30 in contact with the electrolyte. In such instance, automatic unpacking of the conductive particles 58 in chamber 16 would be achieved by reversing the flow of pump 48 and reversing the flow of electrolyte in chamber 16.

We claim:

1. A method for conducting high rate electrochemical reactions comprising the steps of:
    dynamically packing conductive particles against a fluid porous, particle restraining means and in contact with an electrical conductor by rapidly flowing an electrolyte fluid through said particles and said particle restraining means;
    communicating said dynamically packed particles with a spaced counterelectrode through at least one electrolyte;
    interconnecting said dynamically packed particles and said counterelectrode through external circuit means to obtain high rate electrochemical reactions in said cell;
    periodically stopping said rapid electrolyte fluid flow and interrupting said cell reactions to automatically unpack said dynamically packed particles;
    upon each such termination, dynamically repacking said conductive particles into new particle relationships by again rapidly flowing said electrolyte fluid through said particles and said porous restraining means; and
    resuming said cell reactions.

2. A method of purifying an aqueous solution containing an electrochemically reactive impurity comprising the steps of:
    rapidly flowing said solution through loose discrete insoluble metal particles in a substantially closed chamber to dynamically pack them against a porous restraining means in said chamber;
    applying an electrical potential of one polarity to said dynamically packed particles;
    applying an electrical potential of opposite polarity to a counterelectrode spaced from but in communication with said dynamically packed particles through at least one electrolyte;

periodically stopping said rapid electrolyte fluid flow and interrupting application of said electrical potentials to permit gravity aided automatic unpacking of said dynamically packed particles;

upon each such termination, dynamically repacking said conductive particles into new particle relationships against said porous restraining means by again rapidly flowing said electrolyte fluid through said chamber; and reapplying said electrical potentials.

\* \* \* \* \*